(12) United States Patent
Rostamy et al.

(10) Patent No.: US 6,330,431 B1
(45) Date of Patent: *Dec. 11, 2001

(54) METHOD AND APPARATUS FOR MEASURING SIGNAL QUALITY IN A WIRELESS COMMUNICATION SYSTEM

(75) Inventors: Jafar Rostamy, Solna; Peter Wahlström, Bromma, both of (SE)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/111,858

(22) Filed: Jul. 8, 1998

(30) Foreign Application Priority Data

Jul. 8, 1997 (GB) .................................................. 9714414

(51) Int. Cl.$^7$ ..................................................... H04B 17/00
(52) U.S. Cl. ..................................... 455/226.1; 455/226.3; 375/349
(58) Field of Search ............................... 455/226.1, 226.2, 455/226.3, 67.1, 67.3; 375/346, 348, 349

(56) References Cited

U.S. PATENT DOCUMENTS

| | | | |
|---|---|---|---|
| 4,835,790 | * 5/1989 | Yoshida et al. | 455/226.3 |
| 5,450,623 | * 9/1995 | Yokoyama et al. | 455/226.1 |
| 5,465,412 | * 11/1995 | Mueller et al. | 375/346 |
| 5,506,869 | * 4/1996 | Royer | 455/226.3 |
| 5,822,380 | * 10/1998 | Bottomley | 375/347 |
| 6,028,894 | * 2/2000 | Oishi et al. | 455/226.3 |

FOREIGN PATENT DOCUMENTS

| | | |
|---|---|---|
| 94/05100 | 3/1994 | (WO) . |
| 96/04738 | 2/1996 | (WO) . |

* cited by examiner

*Primary Examiner*—Edward F. Urban
(74) *Attorney, Agent, or Firm*—Burns, Doane, Swecker & Mathis, L.L.P.

(57) ABSTRACT

A method is described of measuring the burst quality of a received signal. Specifically, the impairment correlation matrix, used to provide an estimate of impairment correlation properties for use in demodulating radio signals received by a plurality of antennas, is used to obtain the parameters necessary to obtain measurements of the burst quality, with respect to the signal to noise ratio and the signal to interferer ratio respectively. Specific algorithms for calculating the burst quality are also disclosed.

7 Claims, 2 Drawing Sheets

METHOD AND APPARATUS FOR MEASURING SIGNAL QUALITY IN A WIRELESS COMMUNICATION SYSTEM

TECHNICAL FIELD OF THE INVENTION

This invention relates to a method, primarily for use in a digital mobile radio communications system, for forming a quality measure of a signal burst. The invention relates also to a radio receiver which utilises the method.

DESCRIPTION OF RELATED ART

WO94/05100 discloses a method for forming a signal quality measure of a signal burst received in a receiver. The method comprises using a channel estimator to form an estimate of the energy of the useful signal contained in the received signal vector, and forming an estimate of the energy of the remaining signal components of the signal vector, and forming the burst quality measure based on the two estimates.

However, this method has the disadvantage that the error signal is the sum of noise components of the received signal, and of received interference signals. As a result, it is not possible to obtain measurements of the burst quality with respect to the signal to noise ratio, or of the burst quality with respect to the signal to interferer ratio.

There is known from WO96/04738 a method of Interference Rejection Combining, for use in a multi-antenna digital cellular communications system. In such a method, an impairment correlation matrix is used to provide an estimate of impairment correlation properties for use in demodulating radio signals received by a plurality of antennas.

SUMMARY OF THE INVENTION

The present invention seeks to provide a method of obtaining measurements of the burst quality, with respect to the signal to noise ratio and the signal to interferer ratio respectively.

In particular, the invention relates to the use of an inverse impairment correlation matrix to obtain the necessary parameters, and to the use of specific algorithms for calculating the burst quality.

The invention relates also to a radio receiver which carries out the method.

Preferred embodiments of the invention provide methods, and radio receivers, which can provide separate measurements of the burst quality with respect to the signal to noise ratio and the signal to interferer ratio.

DETAILED DESCRIPTION OF PREFERRED EMBODIMENTS

As is well known, for example from the document WO96/04738 mentioned above, a radio transmitter receives a digital symbol sequence S, which typically may be subject to digital to analog (D/A) conversion, modulation, pulse shape filtering, amplification, and transmission as an analog signal. The communication system may operate using frequency division multiple access (FDMA), time division multiple access (TDMA), or code division multiple access (CDMA), or some combination thereof.

Figure 1:
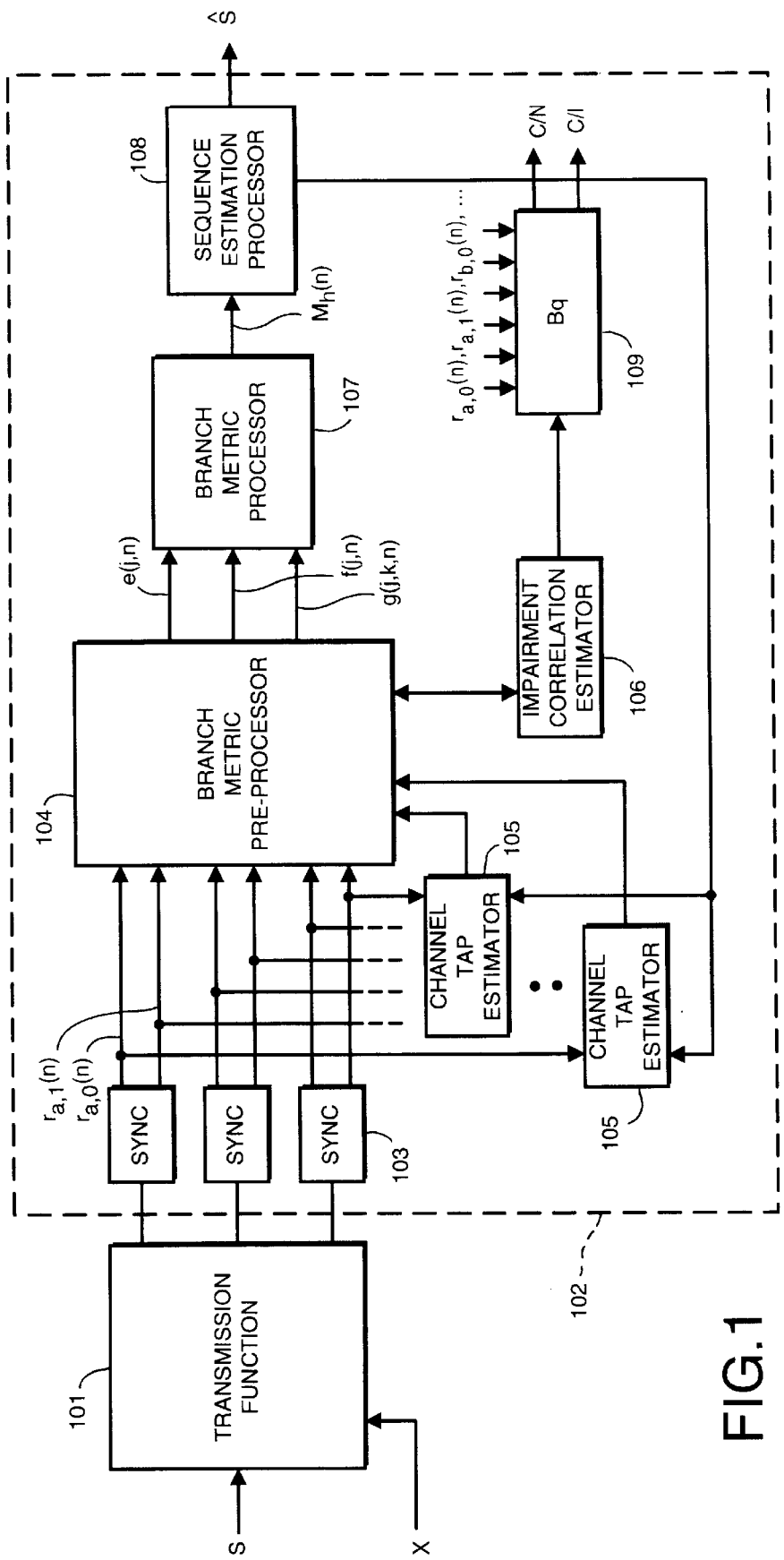
FIG. 1 is a schematic illustration of a receiver processor according to the present invention.

The signal travels over a radio channel, and is intercepted by a plurality of antennas at the receiver. The embodiment illustrated in FIG. 1 is appropriate for the situation in which there are three such antennas a, b and c.

Each antenna passes the received signals to a radio unit, which amplifies, then converts, and filters the received signals according to known methods. Each analog signal is sent to an analog to digital (A/D) converter, which converts the analog signal into a received signal sample stream. In FIG. 1, the signal path through the transmitter, the radio transmission channel, the antennas, radio units and A/D converters is referred to as the transmission function 101.

The elements of the transmission function 101 typically act to produce noise which is therefore also received in the receiver. In addition, there may also exist a signal X which acts as an interferer, and which is also received by the receiver.

The output signal sample streams from the A/D converter in the transmission function are passed to a processing unit 102, which acts to produce an estimate $\hat{S}$ of the transmitted digital signal stream S.

Within the processing unit 102, the respective signals from the three antennas are passed to respective signal pre-processor, or sync, blocks 103.

In this illustrated embodiment, fractionally-spaced equalisation (or T/M equalisation, in which T is the symbol period and M is the number of samples per symbol period) is employed, in a known way. In this case, each sync block 103 generates, from each incoming received signal sample stream, two samples per symbol period (that is, M=2), corresponding to two different sample phases. Thus, in FIG. 1, samples $r_{a,0}(n)$ and $r_{a,1}(n)$, where n is the time index, are generated from the signal sample stream received by an antenna a. Similarly, samples $r_{b,0}(n)$, $r_{b,1}(n)$ and $r_{c,0}(n)$, $r_{c,1}(n)$ are generated from the two sample streams received from the other two antennas b and c respectively. The samples from the sync blocks 103 are passed to a branch metric pre-processor 104, which also receives channel tap estimates from respective channel tap estimators 105, of which there is one for each of the signals $r_a(n)$–$r_c(n)$.

The branch metric pre-processor 104 also receives an input from an impairment correlation estimator 106, which estimates the impairment correlation properties over the antennas and sampling phases, as will be described in more detail below.

In the illustrated embodiment, the branch metric pre-processor calculates metric multipliers $e(j,n)$, $f(j,n)$ and $g(j,k,n)$, which are used by the branch metric processor 107 to compute the branch metric $M_h(n)$, which is passed to the sequence estimation processor 108 to determine the estimated symbol sequence $\hat{S}$. The calculation of the metric multipliers and the computation of the branch metric is described in more detail on pages 18–19 of WO96/04738.

As mentioned previously, the processing unit 102 as described so far is known, for example from the document WO96/04738 mentioned above.

However, in accordance with the invention, the processing unit further comprises means for determining the burst quality of the received signal, with respect to the signal to noise (or carrier to noise) ratio C/N, and/or with respect to the signal to interferer (or carrier to interferer) ratio C/I.

Figure 2:
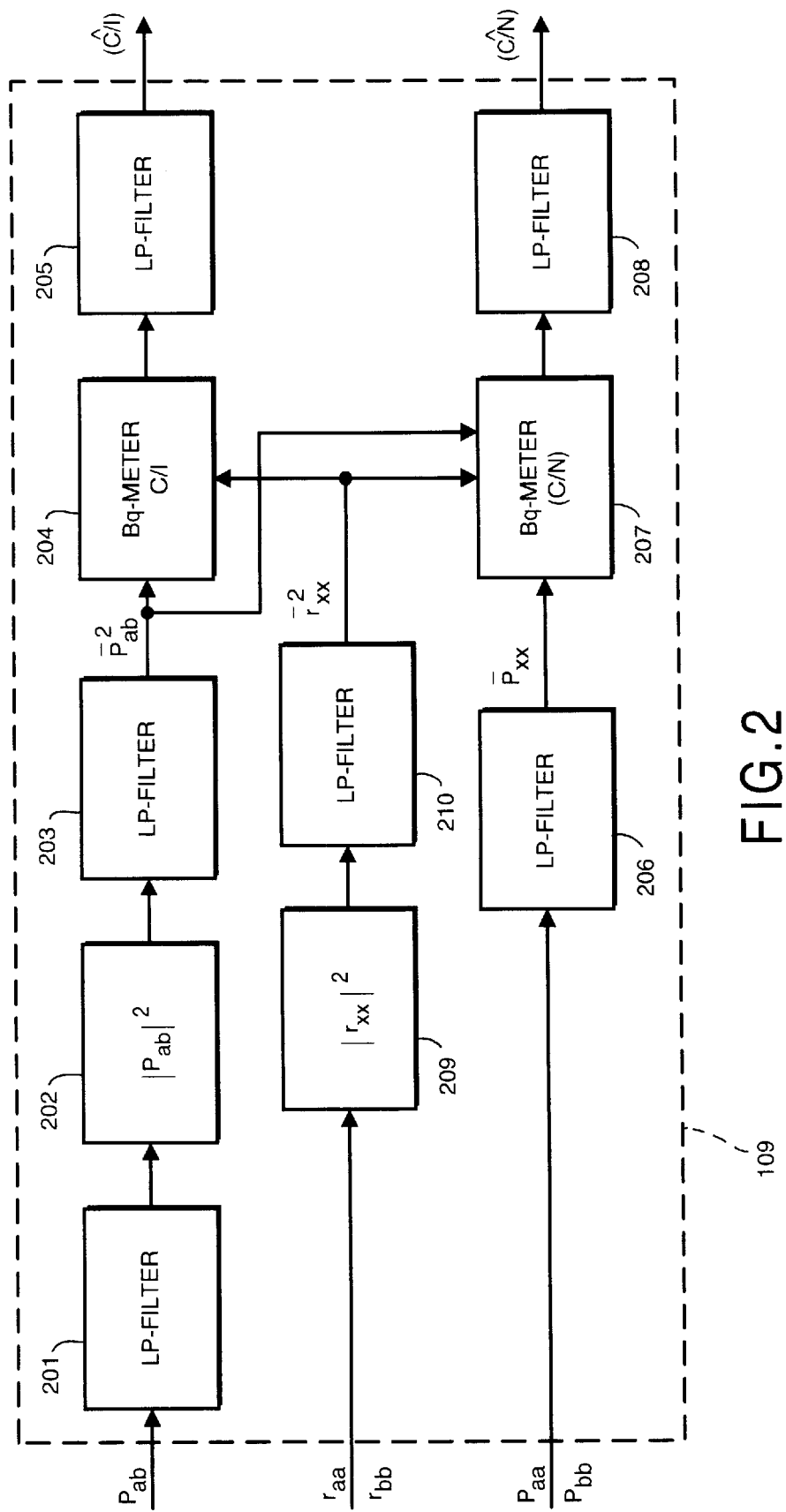
FIG. 2 is a schematic illustration of a component of the processor shown in FIG. 1.

Specifically, the processing unit 102 includes a burst quality measuring block BQ 109, which receives the estimate of the impairment correlation properties from the impairment correlation estimator 106. The structure of the BQ measurement block 109 is illustrated in more detail in FIG. 2. The FIG. 2 embodiment, and the further description herein, relate to a receiver having two antennas a and b, and symbol spaced equalisation, in which, therefore, the impairment correlation matrix is a 2×2 matrix, for ease of explanation. However, it will be appreciated by the person skilled in the art that the receiver may have any desired number of antennas, and the number M of samples per symbol period may take any value, and the principle will remain the same.

As is known, an impairment correlation matrix is often referred to as $R_{zz}(n)$, with the inverse impairment correlation matrix ($A(n)$) then being given by:

$$A(n) = R_{zz}(n)^{-1},$$

with $A(n)$ being the estimate of the inverse impairment correlation matrix at time n. However, the invention is not limited to the use of any particular matrix calculated in any particular way, and any convenient impairment correlation property may be used. Moreover, the $A(n)$ matrix may be the inverse of $R_{zz}(n)$ as exemplified above, or may be some related quantity such as the adjoint or pseudo-inverse.

However, in one example:

$$A = \frac{1}{(P_{aa} \cdot P_{bb} - |P_{ab}|^2)} \begin{bmatrix} P_{aa} & -P_{ab} \\ -P_{ab}^* & P_{bb} \end{bmatrix} = W \begin{bmatrix} P_{aa} & -P_{ab} \\ -P_{ab}^* & P_{bb} \end{bmatrix} = R_{zz}^{-1}$$

The variable $P_{aa}$ denotes the impairment power received on antenna a, the variable $P_{bb}$ denotes the impairment power received on antenna b. The off-diagonal matrix elements are the cross correlation values: for example $P_{ab}$ denotes correlation of the impairment received on antenna a with the conjugate of that received on antenna b. Thus the diagonal elements $P_{aa}$ and $P_{bb}$ of the matrix represent the total impairment, resulting from noise and interference, while the off-diagonal elements $P_{ab}$ and $P_{ab}^*$ of the matrix represent the power of the interference signals.

The A-matrix can be estimated in a variety of ways, for example it can be estimated by arithmetical averaging during data detection by first order low pass filtering of the error signals from channel estimation algorithm.

The elements of the A-matrix are input to the Bq measuring block 109, as are the samples $r_{a,0}(n)$, $r_{a,1}(n)$, $r_{b,0}(n)$, $r_{b,1}(n)$, $r_{c,0}(n)$ and $r_{c,1}(n)$ described earlier.

In order to measure the burst quality with respect to the carrier to interferer ratio C/I, the off-diagonal elements of the matrix are used. Firstly, these elements are passed to a low pass filter 201, in order to suppress the noise which results from the use of a fast tracking algorithm which is necessary to compensate for the fact that the channel may be fast fading. The filtered components are passed to a power measuring block 202, the output signal from which is averaged by a low pass filter 203, or some other sort of averaging filter, in order to eliminate the effect of fading. In the case of a burst received in the D-AMPS system, this power can be averaged over a complete burst.

The signal power is measured in block 209, and the output signal thereof will be averaged by a low pass filter block 210.

The burst quality with respect to the carrier to interferer is then calculated in Bq meter block 204, based on output signals from low pass filters 203 and 210, using the algorithm:

$$Bq = \alpha_i \cdot \log\left(\frac{\overline{r_{aa}}^2 + \overline{r_{bb}}^2}{2 \cdot \left(\overline{P_{ab}}^2 - \varphi_i\right)}\right) + \beta_i$$

in which the coefficients α, β and φ are chosen empirically in each case. (The logarithm to base 10 may conveniently be used, but it will be appreciated that the choice of base will not affect the results significantly as appropriate coefficients can be chosen). The value of α is used to adjust the slope of the relationship, β is used to adjust the offset, and φ is used to eliminate errors caused by the channel estimator, the IF filter and all other internal sources of error. The index i in the algorithm implies that these coefficients are used to calculate burst quality with respect to the carrier to interferer. This algorithm is used for the case of having two antennas a and b. In the general case with T antennas and M samples per symbol period, it is:

$$B_q = \alpha_i \cdot \log\left(\frac{\hat{C}}{(\hat{I} - \varphi_i)}\right) + \beta_i$$

where:

$\hat{C}$ is the carrier estimate $\hat{I}$ is the interference estimate $$\hat{C} = \frac{1}{T} \cdot \frac{1}{M} \sum_{t}^{T} \sum_{m}^{M} \overline{r_{t,m}}^2$$

$$\hat{I} = \sum_{i}^{T-1} i \cdot \sum_{i=1}^{T-1} \sum_{j=i+1}^{T} |\overline{P_{ij}}|^2$$

where:

T is the number of antennas

M is the number of samples per symbol period and $P_{ij}$ are the off-diagonal elements of an inverse impairment correlation matrix.

The measured burst quality is then supplied to a further low pass filter 205 to reduce variations in the measured value due to fading.

In order to calculate the burst quality with respect to the carrier to noise ratio, C/N, both the diagonal and the off-diagonal elements of the A-matrix are used. Specifically, the diagonal elements are passed to a low pass filter 206, and then, together with the outputs from the low pass filters 203 and 210, to the carrier to noise Bq meter 207, which for the case with two antennas a and b, uses the algorithm:

$$Bq = \alpha_n \cdot \log\left(\frac{\overline{r_{xx}}^2}{\overline{P_{xx}}^2 - k \cdot \overline{P_{ab}}^2 - \varphi_n}\right) + \beta_n$$

in which he parameters α, β and φ take empirically determined values. The k value is ideally 1. The index n in the algorithm implies that these coefficients are used to calculate burst quality with respect to the carrier to noise. This algorithm is generalised to:

$$B_q = \alpha_n \cdot \log\left(\frac{\hat{c}}{(\hat{N} - \varphi_n)}\right) + \beta_n$$

where:

$$\hat{N} = \frac{1}{T} \cdot \sum_{i=1}^{T} \overline{P_{ii}} - \hat{I}$$

where:
ĉ is the carrier estimate
Î is the interference estimate
N̂ is the noise estimate $$\hat{C} = \frac{1}{T} \cdot \frac{1}{M} \sum_{t}^{T} \sum_{m}^{M} \overline{r_{t,m}}^2$$

where:

$$\hat{I} = \sum_{i}^{\frac{1}{T-1}} i \cdot \sum_{i=1}^{T-1} \sum_{j=i+1}^{T} |\overline{P_{ij}}|^2$$

where:
T is the number of antennas
M is the number of samples per symbol period and
$P_{ii}$ are the diagonal elements of an inverse impairment correlation matrix.

Again, the output signal is passed to a low pass filter 208 before being output.

The calculated burst quality measurements can then be used to provide statistics relating to the environment, and in assessing hand off requirements.

What is claimed is:

1. A method of measuring the quality of a received signal burst, the method comprising:
   deriving a plurality of signal sample streams from the received signal burst;
   obtaining an impairment correlation matrix from the derived signal sample streams;
   deriving a measure of the signal power in the received signal burst;
   deriving a measure of the noise power in the received signal burst from the impairment correlation matrix;
   deriving a measure of the burst quality with respect to carrier to noise ratio using an algorithm of the general form:

$$B_q = \alpha_n \cdot \log\left(\frac{\hat{c}}{(\hat{N} - \varphi_n)}\right) + \beta_n$$

where:

$$\hat{N} = \frac{1}{T} \cdot \sum_{i=1}^{T} \overline{P_{ii}} - \hat{I}$$

where:
ĉ is the carrier estimate
Î is the interference estimate
N̂ is the noise estimate
where:

$$\hat{C} = \frac{1}{T} \cdot \frac{1}{M} \sum_{t}^{T} \sum_{m}^{M} \overline{r_{t,m}^2}$$

T is the number of antennas
M is the number of samples per symbol period and
$P_{ii}$ are the diagonal elements of an inverse impairment correlation matrix.

2. A method as claimed in claim 1, wherein the measure of the noise power is derived from diagonal elements of an inverse impairment correlation matrix.

3. A method of measuring the quality of a received signal burst, the method comprising:
   deriving a plurality of signal sample streams from the received signal burst;
   obtaining an impairment correlation matrix from the derived signal sample streams;
   deriving a measure of the signal power in the received signal burst.
   deriving a measure of the interferer power in the received signal burst from the impairment correlation matrix;
   deriving a measure of the burst quality with respect to carrier to interferer ratio using an algorithm of the general form:

$$B_q = \alpha_i \cdot \log\left(\frac{\hat{C}}{(\hat{I} - \varphi_i)}\right) + \beta_i$$

where:
Ĉ is the carrier estimate
Î is the interference estimate $$\hat{C} = \frac{1}{T} \cdot \frac{1}{M} \sum_{t}^{T} \sum_{m}^{M} \overline{r_{t,m}^2}$$

where:

$$\hat{I} = \sum_{i}^{\frac{1}{T-1}} i \cdot \sum_{i=1}^{T-1} \sum_{j=i+1}^{T} |\overline{P_{ij}}|^2$$

T is the number of antennas
M is the number of samples per symbol period and
$P_{ij}$ are the off-diagonal elements of an inverse impairment correlation matrix.

4. A method as claimed in claim 2, wherein the measure of the interferer power is derived from off-diagonal elements of an inverse impairment correlation matrix.

5. A method of measuring the quality of a received signal burst, the method comprising:
   deriving a plurality of signal sample streams from the received signal burst;
   obtaining an impairment correlation matrix from the derived signal sample streams;
   deriving a measure of the signal power in the received signal burst;
   deriving a measure of the noise power in the received signal burst from the impairment correlation matrix;

deriving a measure of the interferer power in the received signal burst from the impairment correlation matrix;

deriving a first measure of the burst quality with respect to carrier to noise ratio using an algorithm of the general form:

$$B_q = \alpha_n \cdot \log\left(\frac{\hat{c}}{(\hat{N} - \varphi_n)}\right) + \beta_n$$

where:

$$\hat{N} = \frac{1}{T} \cdot \sum_{i=1}^{T} \overline{P_{ii}} - \hat{I}$$

where:
ĉ is the carrier estimate
Î is the interference estimate
N̂ is the noise estimate where:

$$\hat{C} = \frac{1}{T} \cdot \frac{1}{M} \sum_{t}^{T} \sum_{m}^{M} \overline{r_{t,m}^2}$$

T is the number of antennas
M is the number of samples per symbol period and
$P_{ii}$ are the diagonal elements of an inverse impairment correlation matrix; and deriving a second measure of the burst quality with respect to carrier to interferer ratio using an algorithm of the general form:

$$B_q = \alpha_i \cdot \log\left(\frac{\hat{C}}{(\hat{I} - \varphi_i)}\right) + \beta_i$$

where:
Ĉ is the carrier estimate
Î is the interference estimate $$\hat{C} = \frac{1}{T} \cdot \frac{1}{M} \sum_{t}^{T} \sum_{m}^{M} \overline{r_{t,m}^2}$$

where:

$$\hat{I} = \sum_{i}^{T-1} \frac{1}{i} \cdot \sum_{i=1}^{T-1} \sum_{j=i+1}^{T} |\overline{P_{ij}}|^2$$

T is the number of antennas
M is the number of samples per symbol period and
$P_{ij}$ are the off-diagonal elements of an inverse impairment correlation matrix.

6. A radio receiver, comprising:

means for deriving a plurality of signal sample streams from the received signal burst;

means for obtaining an impairment correlation matrix from the derived signal sample streams;

means for deriving a measure of the signal power in the received signal burst;

means for deriving a measure of the noise power in the received signal burst from the impairment correlation matrix; and means for deriving a measure of the burst quality with respect to carrier to noise ratio using an algorithm of the general form:

$$B_q = \alpha_n \cdot \log\left(\frac{\hat{c}}{(\hat{N} - \varphi_n)}\right) + \beta_n$$

where:

$$\hat{N} = \frac{1}{T} \cdot \sum_{i=1}^{T} \overline{P_{ii}} - \hat{I}$$

where:
ĉ is the carrier estimate
Î is the interference estimate
N̂ is the noise estimate where:

$$\hat{C} = \frac{1}{T} \cdot \frac{1}{M} \sum_{t}^{T} \sum_{m}^{M} \overline{r_{t,m}^2}$$

T is the number of antennas
M is the number of samples per symbol period and
$P_{ii}$ are the diagonal elements of an inverse impairment correlation matrix.

7. A radio receiver comprising:

means for deriving a plurality of signal sample streams from the received signal burst;

means for obtaining an impairment correlation matrix from the derived signal sample streams;

means for deriving a measure of the signal power in the received signal burst;

means for deriving a measure of the interferer power in the received signal burst from the impairment correlation matrix; and means for deriving a measure of the burst quality with respect to carrier to interferer ratio using an algorithm of the general form:

$$B_q = \alpha_i \cdot \log\left(\frac{\hat{C}}{(\hat{I} - \varphi_i)}\right) + \beta_i$$

where:
Ĉ is the carrier estimate
Î is the interference estimate $$\hat{C} = \frac{1}{T} \cdot \frac{1}{M} \sum_{t}^{T} \sum_{m}^{M} \overline{r_{t,m}^2}$$

where:

$$\hat{I} = \sum_{i}^{T-1} i \cdot \sum_{i=1}^{T-1} \sum_{j=i+1}^{T} |\overline{P_{ij}}|^2$$

T is the number of antennas

M is the number of samples per symbol period and $P_{ij}$ are the off-diagonal elements of an inverse impairment correlation matrix.

* * * * *